INVENTOR.
WENDELL H. LEA
BY
Curtis, Morris & Safford
ATTORNEYS

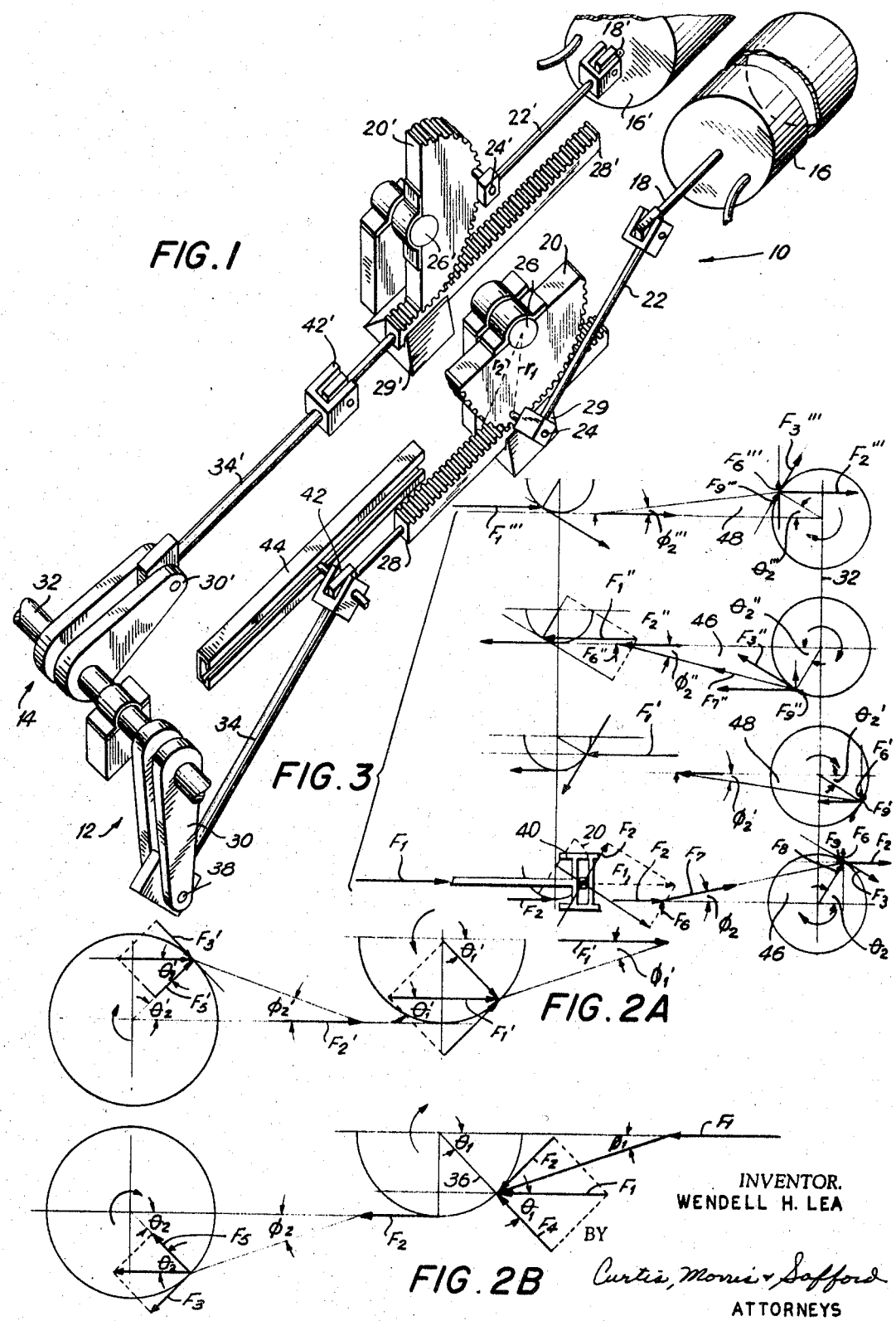

Aug. 5, 1969 W. H. LEA 3,459,056
CONSTANT TORQUE TRANSMISSION
Filed Dec. 15, 1966 3 Sheets-Sheet 3

INVENTOR.
WENDELL H. LEA
BY
Curtis, Morris & Safford
ATTORNEYS 3,459,056
CONSTANT TORQUE TRANSMISSION
Wendell H. Lea, Englewood, N.J.
(% Seamen's Unit, Rincon Annex, San Francisco, Calif.)
Filed Dec. 15, 1966, Ser. No. 602,003
Int. Cl. F16h 19/04, 19/08
U.S. Cl. 74—32        13 Claims

ABSTRACT OF THE DISCLOSURE

A mechanism for converting constant reciprocal motion to or from constant torque rotary motion. This mechanism is typically made up of two separate but identical mechanical linkage units which work in parallel but 90° out of phase from one another in connection with a common rotary shaft. Each unit comprises two serially coupled transmission means. Each transmission means is designed to transmit a force F with a resultant force $F \sin \theta$. This mechanism results in equal constant forces being applied reciprocally to the serially coupled transmission means resulting in a constant torque on the rotary shaft, and vice versa.

---

This invention relates to apparatus for converting reciprocating motion to and from rotary motion; and more particularly, for converting between a rotary motion with constant torque and a reciprocating linear motion with a constant force. This invention is especially useful in systems employing piston-type fluid motors which utilize a fluid under constant pressure.

The art of converting between reciprocal and rotary motion by mechanical linkages has been quite highly developed with any further significant improvements occurring only rarely. However, applicant has observed that there has been a singular lack of awareness in the prior art of nonuniformity of transmission whereby a constant force does not beget nor result from a constant torque. Most of the prior art is concerned wtih avoiding dead center problems, power losses, or other inefficiencies; particularly of non-uniform power sources (e.g. an internal combustion engine or similar expanding gas systems).

An object of the present invention is to provide an apparatus for converting one type of constant motion into a constant motion of another type. Another object is to convert linear motion having a given force to rotary motion having a constant torque. A further object is to provide a transmission system which substantially compensates for any deviation from uniformity of conversion. Still another object is to provide a mechanical transmission system which converts a force, F, into a force, $kF \sin^2 \theta$, applied as a torque (where $k$ is a constant which may be thought of as a mechanical advantage ratio). A still further object is to provide a compact drive package capable of delivery of a constant torque, and advantageously may be applied as individual independent drive units for each wheel of a vehicle.

A preferred embodiment of this invention employs two fluid motors having essentially identical output characteristics so as to generate constant and equal reciprocal motions but which are 90° out of phase from one another. These two linear motors drive a common rotary shaft through two units made up of identical separate mechanical linkages. Each unit comprises two serially coupled transmissions means. In the first transmission means each such linear motor rotates a respective 180° sector gear oriented on an axis in a plane which is a perpendicular to the line of action of each respective motor. The rotation of the sector gear is accomplished by a crank arm (or its equivalent) which rotates with the sector gear and which is joined from its free end to fluid motor piston by a long pitman linkage (or a crosshead with a perpendicular lost motion slot). Each sector gear in turn engages and drives a rack engaged tangentially. In the second transmission means this rack similarly rotates the driven rotary shaft by a crank arm attached thereto via a pitman linkage or crosshead wherein the axis of driven rotary shaft is in a plane perpendicular to the line of action of each respective rack (and in the case of a pitman linkage this line of rack action intercepts the shaft axis so as to preserve the sine function). The first and second transmission means may have any special relation to each other provided the sector gear and its respective rack both act in the same plane. Note that each unit is connected to said rotary shaft in a manner to convey its motion to said shaft 90° out of phase from the other unit. For example, if the racks are parallel to one another the crank arms on the driven rotary shaft are set at 90° to one another, but if the racks are perpendicular, then these racks can be joined to a common crank arm on the rotary drive shaft.

It will be appreciated that several of the conditions just set forth for the preferred embodiment may under special conditions be violated and still preserve the basic sine functions. However, any such variations ordinarily are complicating factors which do not add to the desirability of the invention and, therefore, are not to be preferred.

The result of this mechanical arrangement is that the effectiveness of each unit is substantially complimentary to the other, as will be further discussed below, such that the two units acting together result in a constant torque. Note also that deviations from constant torque introduced by the pitman linkages acting on the rotary shaft, as discussed below, can be eliminated by the use of four units respectively 90°, 180°, and 270° out of phase from one another. Thus, it can be readily appreciated that other equal multiple arangements can be used to practice this invention as can other mechanically equivalent linkages for achieving the same result within the teachings of this invention.

An advantage of this invention and the preferred embodiment just described is that the mechanism is reversible so that constant torque can be converted into reciprocating constant linear forces.

It will be readily appreciated that another advantage of this invention is that all inertial forces imparted to the crankshaft at any point in the cycle resulting from those masses of the units which are actually integral with or bear on and which reciprocate with their piston assemblies cancel out to zero.

In this specification and the accompanying drawings I have shown and described a preferred embodiment of my invention and have suggested various alternatives and modifications thereof; but it is to be understood that these are not intended to be exhaustive and that many other changes and modifications can be made within the scope of the invention. These suggestions herein are selected and included for purposes of illustration in order that others skilled in the art will more fully understand the invention and the principles thereof and will thus be enabled to modify it and embody it in a variety of forms, each as may be best suited to the conditions of a particular use.

In the accompanying drawings:

FIGURE 1 is a perspective view of a simplified preferred embodiment of the present invention;

FIGURE 2A shows a vector force diagram analyzing the clockwise rotation of the rotary shaft illustrated in FIGURE 1 with a hydraulic motor pulling;

FIGURE 2B shows a similar vector force diagram of a second transmission unit illustrating how a hydraulic motor pushing and 90° out of phase from FIGURE 2A would look;

Figure 4:
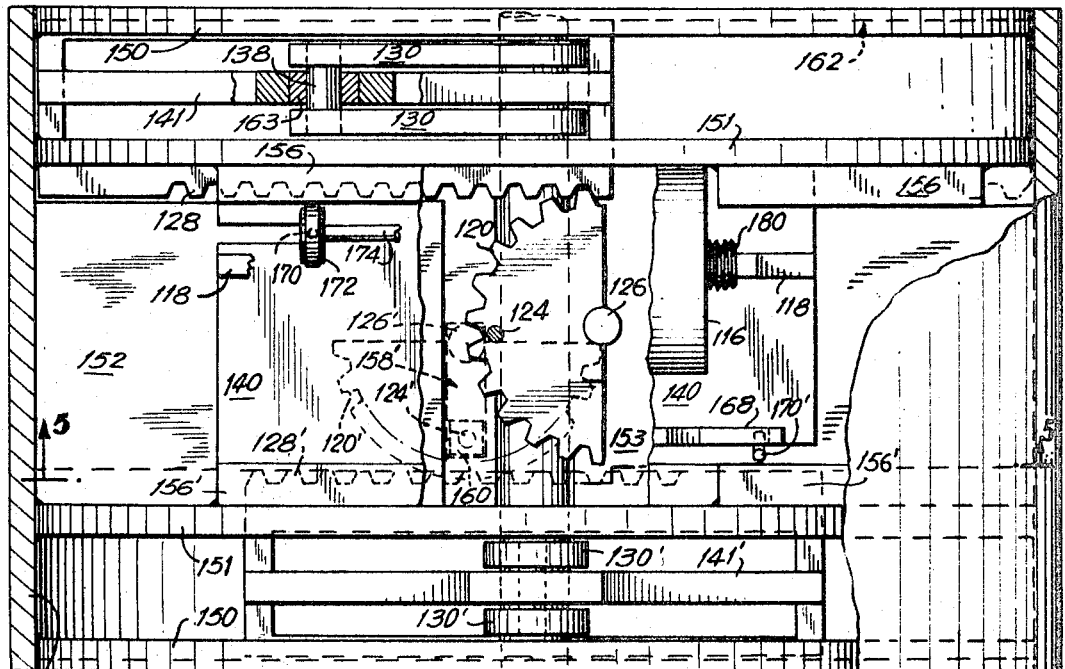
Figure 5:
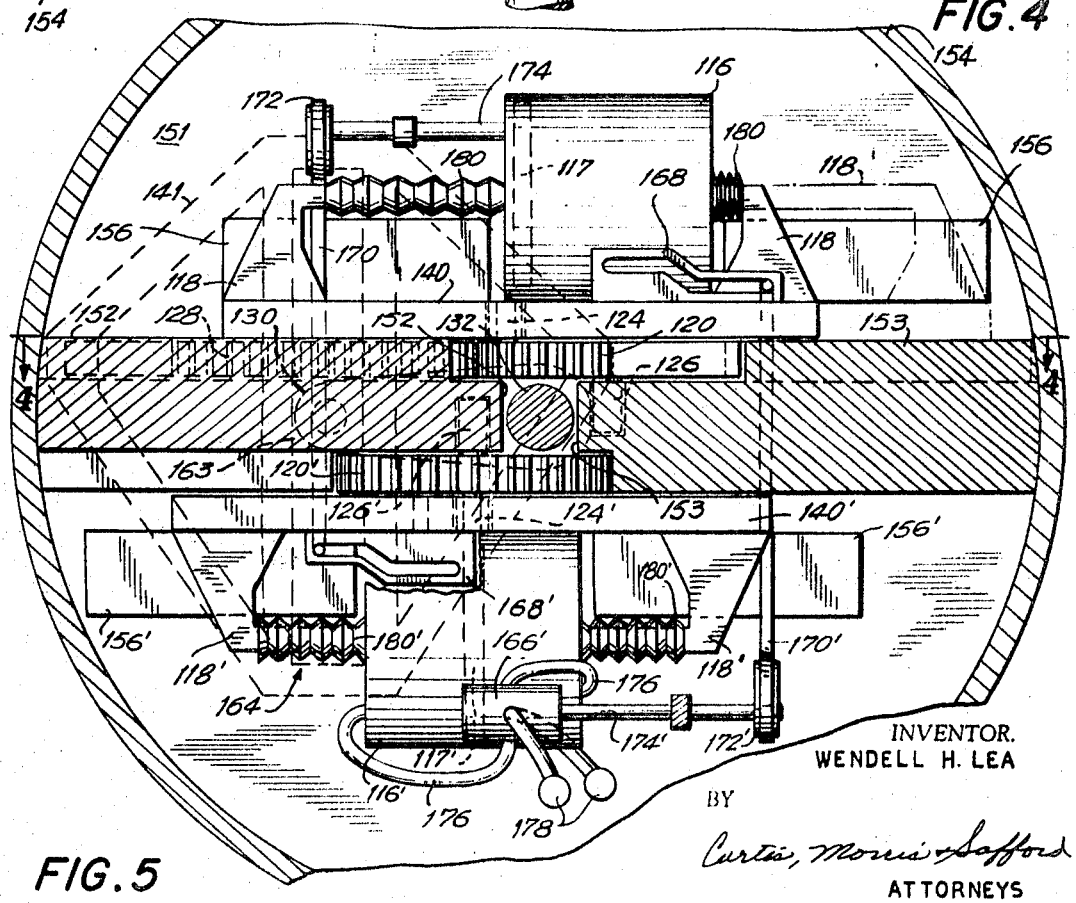

FIGURE 3 shows the vector force diagram analysis for another preferred embodiment of this invention wherein the mechanical transmission linkages (e.g. as illustrated in FIGURE 1) are increased from two to four in number; for purposes of clarity some vector forces have been increased in size greater than their actual value; and for convenience in mathematical presentation, the rotation of the rotary shaft is opposite to that illustrated in FIGURE 2;

FIGURE 4 is a partially sectioned plan view taken along line 4—4 in FIGURE 5 of still another preferred embodiment of the present invention showing a compact arrangement (such as might be usefully employed in propelling wheeled land vehicles or in other applications requiring constant torque);

FIGURE 5 is a side elevational section taken along line 5—5 in FIGURE 4; and

Figure 6:
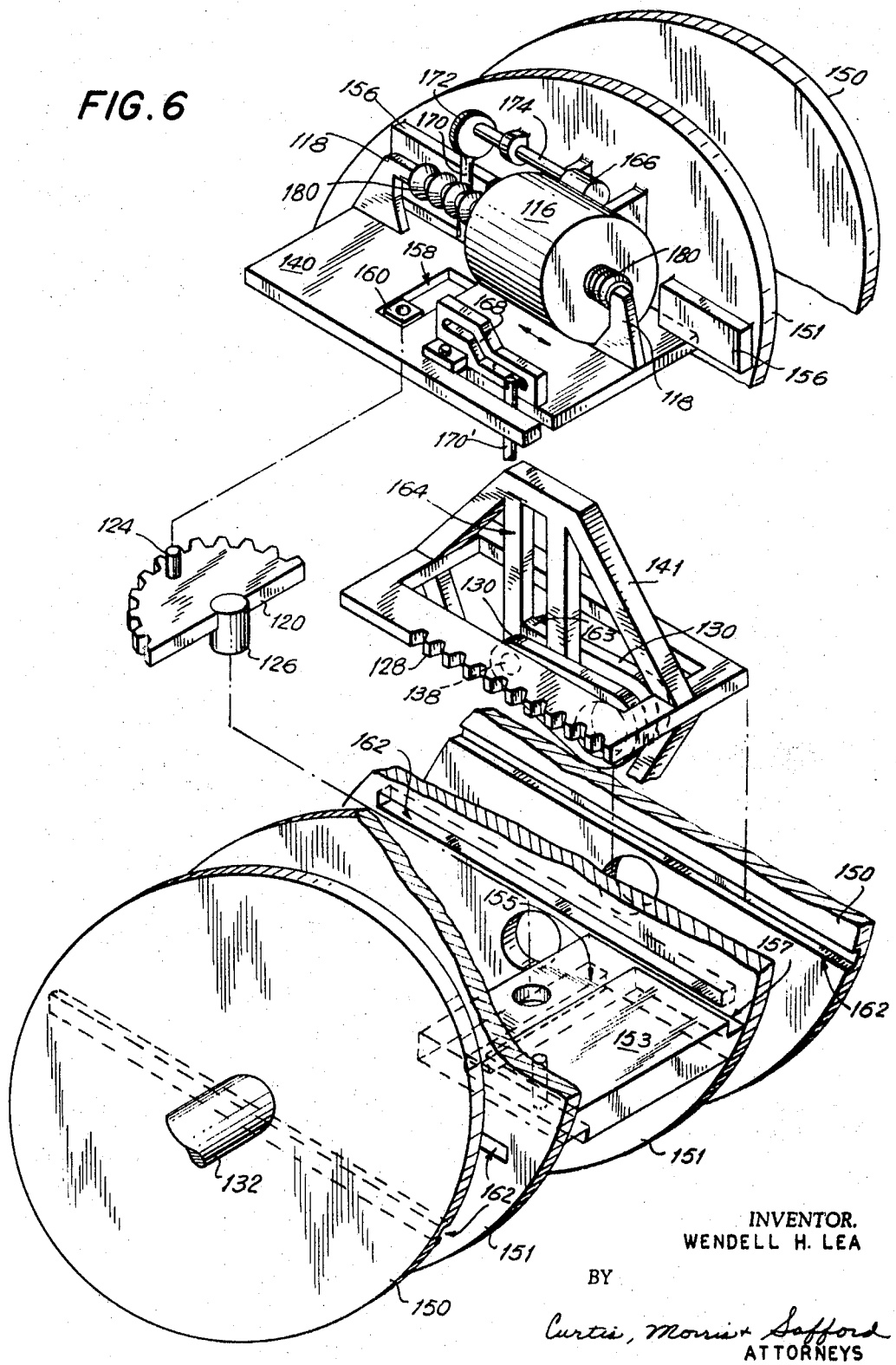

FIGURE 6 is a perspective view of several internal components of the embodiment illustrated in FIGURE 4.

According to the present invention the constant torque from a reciprocal motion having a constant force ($F_1$) can advantageously be achieved by a device 10 having parallel transmission units 12 and 14 which transmit a sine squared function of the drive force (e.g.

$$k_1 F_1 \sin^2 \theta)$$

with the units 90° out of phase. Since $\sin^2 \theta = \cos^2 (90 - \theta)$ and since $\sin_2 \theta + \cos_2 \theta = 1$, thus these two parallel drive forces applied at equal perpendicular distances ($R_1$) to a rotary shaft add to give a constant torque $k_1 F_1 R_1$.

In the apparatus illustrated in FIGURE 1 each transmission unit 12 and 14 consists of an ordinary reciprocating hydraulic motor 16 generating a constant force $F_1$ acting along the piston rod 18. For simplicity, unit 12 will be separately explained and all elements of unit 14 which are similar to those of unit 12 will be indicated by the same reference number but will bear a prime ('). The rod 18 of motor 16 is linked to a gear 20 via a pitman linkage 22 including a pin 24 so as to oscillate the gear 20 through a 180° arc. Gear 20 rotating about shaft 26 drives rack 28. This rack 28 in turn similarly drives a crank arm 30 fixed on rotary shaft 32 in a complete circular motion via a pitman linkage 34.

The operation of the apparatus of FIGURE 1 can best be understood by comparing it to the force vector diagrams of FIGURE 2. FIGURE 1 shows unit 14 with motor 16' at the end of its return stroke relying on unit 12 to carry unit 14 past dead center. Unit 12 is shown in the middle of the forward stroke of motor 16. FIGURE 2A shows the way these units would appear ¾ of the way through their return stroke. FIGURE 2B shows the way these units would appear 90° further on, ¼ of the way through the forward stroke. Thus, in analyzing the motions of the apparatus in FIGURE 1, FIGURE 2A represents unit 14 and FIGURE 2B represents unit 12. For simplicity in the drawing of FIGURE 2 the moment arm $r_1$ of the gear pin 24 is shown as being equal to the radius $r_2$ of pitch circle of the gear 20 (see also FIGURE 1). Pin 24 instead of being connected directly to the gear 20 could be connected to a crank arm 36 (shown diagrammatically in FIGURE 2B) at a radius $r_1$, with the crank arm 36 being fixed to shaft 26 to rotate the gear 20.

In order for transmission unit 12 to convert between the reciprocal force $F_1$ and the torque $k_1 F_1 R_1 \sin^2 \theta$, the rod 18 is perpendicular to the gear shaft 26; the rack 28 is aligned by guide 29 to act along the perpendicular to the rotary shaft 32; and the angle $\theta_1$ (between moment arm through the pin 24, or the crank 36, and the line of action of force $F_1$ along rod 18) equals angle $\theta_2$ (between crank arm 30 and the line of action of force $F_2$ along rack 28).

A force vector $F_1$ acting along rod 18 is applied on crank pin 24 and is resolved into:

(a) An ineffective force $F_4$ along the axis line of the crank, and (b) An effective force $F_2$ tangential to the gear at the pin 24 and which therefore has the value of $F_1 \sin \theta$.

The torque at the pin 24 is $r_1 F_1 \sin \theta$ and the torque at the pitch circle is $r_2(k_1 F_2)$; therefore; force $k_1 F_2$ equals $r_1/r_2 F_1 \sin \theta$ (note $k_1$ equals $r_1/r_2$). The gear 20 transfers this force $k_1 F_2$ to any tangential line of action, including that of the rack 28.

A pitman 34 transfers this force vector $k_1 F_2$ from rack 28 to the main crankpin 38. Here the force vector $k_1 F_2$ is again resolved into:

(a) An ineffective force vector $F_5$ acting along the crank arm 30, and (b) A force vector $F_3$ which is tangential to the crank circle and which therefore has the value of $k_1(F_1 \sin \theta) \sin \theta$.

This last force then creates a torque $k_1 R_1 F_1 \sin^2 \theta$ about the crankshaft 32. $R_1$ is the effective length of the crank arm 30, and therefore the moment arm.

In the same manner a second unit 14 is keyed to the main crankshaft 32 through an identical crank arm 30', which however is set at a 90° angle to that of the first unit 12 described above, so that its angle $\theta'$ is equal to $(90° \pm \theta)$.

In an identical manner force vector $F_1'$ of this unit 14, equal to $\pm F_1$, is similarly transmitted so as to give an effective tangential force $F_3'$ of $k_1 F_1' \sin \theta_1' \cdot \sin \theta_2'$ which is equivalent to $k_1 F_1 \sin (90° - \theta_1) \cdot \sin (90° - \theta_1)$. This latter value can be simplified to $k_1 F_1 \cos^2 \theta$.

This force $F_3'$ creates a torque about the rotary shaft 32 of $k_1 R_1 F_1 \cos^2 \theta$ and is applied at right angles to the force $F_3$ from unit 12.

The torque combined with that from the first unit 12 to give a total torque of $$k_1 R_1 F_1 \sin^2 \theta + k_1 R_1 F_1 \cos^2 \theta = k_1 R_1 F_1 (\sin^2 \theta + \cos^2 \theta)$$

and since $(\sin^2 \theta + \cos^2 \theta) = 1$, this value equals a torque of $k_1 R_1 F_1$ which is a constant for any constant value of $F_1$.

Note that in FIGURE 1 the gear 20 and its pin 24 are illustrated as having rotated more than 90° from the dead center position in which unit 14 is shown. This has been done to give a physical reflection of the compensation required by the energy balance equation to balance the extra work added or subtracted in alternate quadrants due to the action of the force vector $F_9$ caused by the use of pitman linkages (as discussed below), since the applied force $F_1$ being constant cannot compensate.

FIGURE 3 is a force vector diagram for four transmission units on one shaft 32 each 90° out of phase with adjacent ones. For conventional mathamatical treatment, the shaft 32 is shown rotating opposite relative to that shown in FIGURES 2A and 2B. In this arrangement the angle $\phi_2$ which the pitman 34 makes with the line of action is considered for the effect the reactive force of the guide 44 has on the torque applied by each transmission and to the main shaft 32. The purpose of this combination is to balance out the pitman reactive force vector effect to zero so as to preserve the pure sine functions in the overall transmission.

The pitman reactive force vectors introduced by each second pitman (34, 34', 34", 34''') are all applied to the same crankshaft and, therefore, (as shown below) cancel to zero. However, the pitman reactive force vectors introduced by each first pitman (22, 22', 22", 22''') are each applied to separate, necessarily unconnected, gear shafts (26, 26′, 26″, 26‴) and, therefore, cannot cancel. Therefore, in this embodiment a crosshead 40 with a perpendicular lost-motion slot replaces the gear pitman 22. This permits piston force $F_1$ to be transmitted to the gear 20 through the lost motion guide so as to give a pure $F_1 \sin \theta$ force on the rack 28 without any error such as would be introduced by the use of a pitman linkage.

Angle $\phi_2$ causes the pitman coupling 42 to bear against the guide 44 creating a perpendicular reaction force $F_6$ from the guide 44 to the line of action of the rack 28 which increases the compressive force $F_7$ within the pitman 34 which it transmits to the crankpin 38. There this resultant force vector $F_7$ is resolved back into (a) the force vector $F_2$ and (b) also the force vector $F_6$ perpendicular to it.

It can be seen from FIGURE 3 that for a given direction of rotation this force vector $F_6$ is always in the same direction. On the forward stroke the force $F_7$ in the pitman is compressive and, therefore, creates an outward acting force vector $F_6$ from the crank circle, in a direction which is perpendicular to the line of rack action (equivalent to the direction of $F_2$) as the crankpin 38 (from which the force $F_6$ direction originates) is above the center of the crank circle. The same applies to $F_6'''$. On the return stroke the force $F_7'$ in the pitman 34′ is in tension and, therefore, creates an inward perpendicular force vector $F_6'$ acting into the crank circle, and since the crankpin 38′ has now moved, below the crank circle center, this force $F_6'$ is again acting in the same perpendicular direction with respect to the line of action of the rack 28′. The same also applies to $F_6''$.

This perpendicular force vector $F_6$ can then be resolved in turn into:

(a) An ineffective force vector $F_8$ acting along the axis line of the crank arm 30, and (b) An effective force vector $F_9$ perpendicular to that crank axis and, therefore, tangential to the crank circle.

This force $F_9$ therefore has either an additive or subtractive effect on the torque about the crank axis depending on the direction in which the pitman 34 is acting on the crank 32 and depending on the quadrant in which the crankpin 38 is moving.

This pitman angle reaction force vector $F_6$ has the perpendicular value of $F_1 \sin \theta_1 \tan \phi_2$ at the guide 44 (where $F_2 = F_1 \sin \theta$) and therefore also at the crankpin 38.

There, it is resolved:

(a) Along the crank arm 30, ineffectively in the direction of vector $F_8$, and (b) In the effective tangential direction of vector $F_9$ (perpendicular to the former) where it then has the value of $F_1 \sin \theta_1 \tan \phi_2 \cos \theta_2$.

In the four units of FIGURE 3 the crank arms of each diametrically opposite pair have the same value of angle $\theta$ and each adjacent pair have complementary value (e.g. $90° - \theta$). By comparing the triangles 46 and 48 formed by the pitman 34, the crank arm 30, and the action line of the rack 28, it will become apparent that the two opposing units (having opposite cranks) must always have the same value of angle $\phi$, and therefore have the same value and direction for $F_6$. For similar reasons these pairs have the same force vector values $F_9$ for their tangential component, and in the same parallel direction but on opposite sides of the rotary shaft 32, therefore creating equal and opposing torques about that shaft 32. Thus, the total effect is always that they cancel each other's individual effect.

Therefore, all effects of tangential force vectors $F_9$ arising from angle $\phi'$ or $\phi''$ of pairs of pitman (34 and 34″ or 34′ and 34‴), must combine to give a total zero effect on the crankshaft torque.

Thus, the mathematical expressions of the torques in each quadrant (where $R, r_1/r_2, F, \theta$, and opposite pairs of $\phi$ are all equal) are as follows:

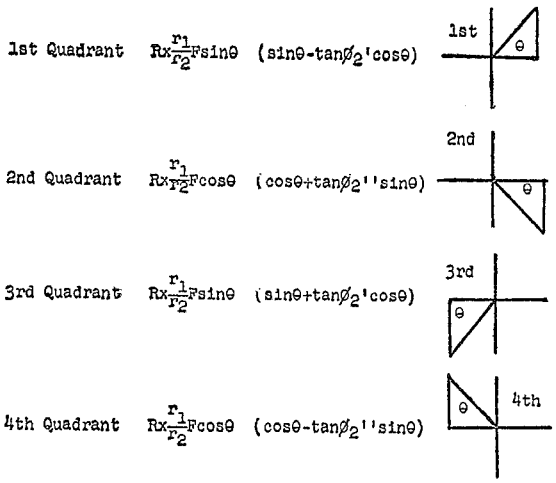

1st Quadrant  $Rx\frac{r_1}{r_2}F\sin\theta$  $(\sin\theta - \tan\phi_2' \cos\theta)$ 2nd Quadrant  $Rx\frac{r_1}{r_2}F\cos\theta$  $(\cos\theta + \tan\phi_2'' \sin\theta)$ 3rd Quadrant  $Rx\frac{r_1}{r_2}F\sin\theta$  $(\sin\theta + \tan\phi_2' \cos\theta)$ 4th Quadrant  $Rx\frac{r_1}{r_2}F\cos\theta$  $(\cos\theta - \tan\phi_2'' \sin\theta)$ Thus, it is seen that quadrants 1 and 3 combine to give $Rr_1/r_2 F \sin^2 \theta_1 \times 2$, and quadrants 2 and 4 combine to give $Rr_1/r_2 F \cos^2 \theta_1 \times 2$, and when these are added their combined torque is $Rr_1/r_2 F \times 2$.

If instead of the crosshead 40 connected to the gear 20, the pitman 22 is used as in FIGURE 2, then the mathematical expressions for the torques on the main shaft at each quadrant (where $\phi_1$ equals $\phi_2$) are as follows:

1st Quadrant $$Rx\frac{r_1}{r_2} \times F_1 \; (\sin \theta_1 - \tan \theta_1 \cos \theta_1)(\sin \theta_1 - \tan \theta_1 \cos \theta_1)$$

2nd Quadrant $$Rx\frac{r_1}{r_2} \times F_1 \; (\cos \theta_1 - \tan \theta_1' \sin \theta_1)(\cos \theta_1 - \tan \theta_1' \sin \theta_1)$$

3rd Quadrant $$Rx\frac{r_1}{r_2} \times F_1 \; (\sin \theta_1 + \tan \theta_1 \cos \theta_1)(\sin \theta_1 + \tan \theta_1 \cos \theta_1)$$

4th Quadrant $$Rx\frac{r_1}{r_2} \times F_1 \; (\cos \theta_1 + \tan \theta_1' \sin \theta_1)(\cos \theta_1 + \tan \theta_1' \sin \theta_1)$$

These reduce to as follows:

1st Quadrant $$Rx\frac{r_1}{r_2} \times F_1 \; (\sin^2 \theta_1 - 2 \tan \theta_1 \cos \theta_1 + \tan^2 \theta_1 \cos^2 \theta_1)$$

2nd Quadrant $$Rx\frac{r_1}{r_2} \times F_1 \; (\cos^2 \theta_1 - 2 \tan \theta_1' \sin \theta_1 + \tan^2 \theta_1' \sin^2 \theta_1)$$

3rd Quadrant $$Rx\frac{r_1}{r_2} \times F_1 \; (\sin^2 \theta_1 + 2 \tan \theta_1 \cos \theta_1 + \tan^2 \theta_1 \cos^2 \theta_1)$$

4th Quadrant $$Rx\frac{r_1}{r_2} \times F_1 \; (\cos^2 \theta_1 + 2 \tan \theta_1' \sin \theta_1 + \tan^2 \theta_1' \sin^2 \theta_1)$$

It can be seen that when combining these torques the middle terms cancel giving:

$$Rx\frac{r_1}{r_2} \times F \times [2(\sin^2 \theta_1 + \cos^2 \theta_1) + 2 \tan^2 \theta_1 \cos^2 \theta_1 + 2 \tan^2 \theta_1' \sin^2 \theta_1]$$

which equals $$2Rx\frac{r_1}{r_2} \times F + 2 \times R \times \frac{r_1}{r_2} \times F \; (\tan^2 \theta_1 \cos^2 \theta_1 + \tan^2 \theta_1' \sin^2 \theta_1)$$

It can be seen from FIGURE 3 that when $\theta_1$ is at or near zero, $\phi_1$, and therefore $\tan \phi_1$, are at or near zero, and this first factor of the last term, $\tan^2 \phi_1 \cos^2 \theta_1$ goes to zero. When $\theta$ is at or near 90°, tan $\phi$ is at its largest value but if the pitmans are long, since tan $\phi$ is squared it is still a small value and also cos $\theta$ is at or near zero; therefore, the first factor is again near zero. Also, tan $^2\phi_2$ is at or near zero and the last factor (tan $^2\phi_2$ sin $^2\theta_1$) goes to zero. Also, when $\theta=45°$, cos$^2$ $\theta$ and sin$^2$ $\theta$ both equal ½ and are multiplied by the squares of the small fractions tan $\phi_{1\text{ and }2}$. Therefore, at all values of $\theta$ with long pitmans the errors introduced on the crankshaft torques is a very small one, rising to a greatest value at $\theta=45°$ (where tan $\phi_{1\text{ and }2}$ are less than their highest value).

FIGURES 4 and 6 illustrate in another preferred embodiment how the present invention can be adapted to compact form. This adaptation can be particularly useful as a vehicle drive package 110, where each package is capable of being applied individually to separate independently sprung wheels.

In this embodiment the sector gears 120 and 120' have been laid between the crank circles of arms 130 and 130' and laid in planes parallel to and sandwiching the rotary drive shaft 132. By use of compact crossheads 140, 140', 141, 141' in place of the long pitman linkages, the necessity for compensating for the pitman reaction forces ($F_6$) is eliminated. These also permit the use of integral racks 128 and 128' and the inclusion of fluid motors 116 and 116' between the crank circles.

The diameter D of the crank circles defined by arms 130 and 130' dictates the minimum first dimension of this drive package 110. The extent of the overall movement of racks 128 and 128' dictates the minimum second dimension, substantially equal to ($2D/\pi$) of the sector gears 120 and 120' plus the thickness of the crank arms 130 and 130', of the racks 128 and 128', and of the supporting structure 150 and 151, all dictate the minimum third dimension (note that if a single crank arm is used and the racks are perpendicular to each other, this minimum dimension is increased by another gear diameter although decreased by a crank arm thickness).

In order to fit the fluid motors 116 and 116' within these minimum dimensions the piston rods 118 and 118' are carried back over and, for stability, fixed at both ends to the respective crossheads 140 and 140'. See FIGURE 6. In this arrangement the piston rods 118 and 118' pass through both ends of each motor 116 and 116'. This has the advantage of presenting an equal area on both sides of the piston 117 so that a constant pressure gives a constant force in both directions regardless of which direction the fluid pressure is applied.

The support frame of this embodiment is best shown in FIGURE 6. It consists of four support discs 150 and 151, two support blocks 152 and 153, and a cylindrical shell 154. The crosshead 140 slides on support blocks 152 and 153 held in position by four guide blocks 156 (crosshead 140' is similarly positioned by guide blocks 156').

In transmission unit 112, the crosshead 140 is reciprocally slid back and forth (see the direction arrows in FIGURE 6), it carries pin 124 with it acting in lost-motion slot 158 via bearing block 160. This causes sector gear 120 to oscillate about its axle 126. Gear 120 is sandwiched within a recess 155 of the support block 153 between the block and the crosshead 140 with axle 126 journalled within said block 153. The oscillating gear 120 drives rack 128. Rack 128 is fixed on the (kite-shaped) crosshead 141. Crosshead 141 slides in guide slots 162 carrying rack 128 along a recess 157 in block 153 (see FIGURE 6). Crosshead 141 in turn drives crank arm 130 (see FIGURE 6) via the crankpin 138 and its bearing block 163 (which act along lost-motion slot 164 of crosshead 141). This driven crank arm 130 thereby rotates crankshaft 132.

Transmission unit 114 (having a prime (') indicating its corresponding elements) operates similarly and is illustrated with the majority of its elements below bearing blocks 152 and 153.

As illustrated in this embodiment each fluid motor 116 and 116' operates the other's fluid valves 166 and 166'. As in a duplex pump with he motors 90° out of phase, this arrangement permits the piston 117 traveling at its fastest point in mid-stroke to operate the valve 166' of the other 117' (which other 117' is at end of its stroke requiring valve reversal). A cam 168' on the other piston's sector gear crosshead plate 140' operates a rod 170 which rotates an eccentric 172 keyed to a shaft 174 which turns a tapered plug four-way valve 166 90° and reverses the fluid pressure to the other side of the piston 117 to reciprocate the motor 116. Advantageously, hydraulic fluid is used which is uncompressible so that there are no cylinder clearance losses with this arrangement. Fluid piping 176 is shown only in FIGURE 5, leading from the valve 166' into the ends of the fluid motor 116'. This piping 176 and its supply piping 178 should be streamlined and otherwise may be placed wherever convenient according to the layout requirements.

Bellows 180 and 180' cover each piston rod to prevent contamination of the rod and the hydraulic fluid by the lubrication grease and vice versa. A small line should carry hydraulic fluid leaking out into each of the bellows beyond the packing glands back from the bellows to the supply side of the hydraulic fluid circulation system. Note that bellows 180 and 180' are surrounded by but are external to piping 176.

The rotation of shaft 132 can be readily reversed by reversing the direction of the hydraulic fluid flow.

Note that this device may be turned on its side from the position illustrated in FIGURE 5 and a reservoir of lubricating oil may be introduced into the shell 154 so that the reciprocating parts can dip and splash down into this reservoir.

FIGURE 4 shows only sleeve bearings and sliding surfaces for simplicity. However, it is intended to use ball and roller bearings on all axles, pins and rollers under all sliding flat surfaces (as crossheads) whenever (1) friction losses can be reduced thereby or (2) smaller components and, therefore, greater compactness can be achieved.

The sector drive means in the illustrated embodiments has been shown as a 180° sector gear (i.e. 20). This means could also be any circularly acting rotary member achieving the same result, such as a 360° gear or a rubber rimmed disc with the rubber replacing the gear teeth in giving a positive drive iwth the linear engageing means (e.g. rack 28 in FIGURE 1).

Other embodiments within the broad scope of this invention will occur to those skilled in the art. For example, a single crank arm pin 238 may be driven by both units 212 and 214 where the second transmission means of each unit are lost-motion slotted crossheads 240 and 240', each set to slide across the other at 90°. Both crossheads 240 and 240' carry the pin 238 within their respective, perpendicularly oriented, lost-motion slots. Racks 228 and 228', perpendicular to each other, are fixed to 216' (driving gear 220 or 220' and its rack 228 or 28') may be in any plane including its respective rack; therefore, the motor may be on the same, the opposite, or the adjacent side of its crosshead as its rack.

I claim:

1. A device having a transmission unit comprising means for reciprocally applying a linear force ($F_1$) along a line of action, first transmission means for mechanically converting between said force ($F_1$) and a transmitted force ($k_1F_2$) where ($F_2$) substantially has a value of ($F_1$) sin $\theta$ and where ($k_1$) is a constant, second transmission means for converting between ($F_2$) and ($F_3$) where said second means maintains that alignment with the first means where the modification it makes with the first, namely the mechanical conversion between ($F_2$) and ($F_3$), is identical to that of the first means between ($F_1$) and ($F_2$), said first and second means are serially coupled, whereby ($F_3$) (being the square of the conversion factor times the original force) has the value of ($k_1 F_1 \sin^2 \theta$), and means of coupling and directing the motion of $F_3$ in a rotary locus.

2. A device as claimed in claim 1 further comprising a second transmission unit which comprises means for reciprocally applying a linear force, first and second transmission means, and coupling means for joining ($F_3'$) of the second unit with the ($F_3$) of the first unit at a common point so as to be additive in a common direction, said second unit having that phase difference of $\theta$ with said first means by which ($F_3'$) and ($F_3$) are additive to a constant value, means of directing the motion of this combination of forces in a linear or rotary manner.

3. A device as claimed in claim 2 further comprising a third and a fourth transmission unit, all of said units being 90° out of phase from one another such that the resulting torques are additive to a substantially constant value of $2 \cdot k_1 R_1 F_1$.

4. A device as claimed in claim 1 wherein said first transmission means comprises a circular sector drive means having its axis of rotation positioned in a plane perpendicular to the line of action of said linear force ($F_1$), coupling means for applying a transmitted force ($F_1$) between a moment arm of said sector drive means where $\theta$ is the angle between the moment arm and the line of action for this force ($F_1$) and for converting between a force ($F_2$) and the force ($F_1$) at the moment arm, and linear engaging means for translating the force $k_1 F_2$ between said sector drive means and along any given tangent, wherein said rotary shaft is positioned in a plane perpendicular to said tangent, wherein said torque means is a crank arm fixed on said rotary shaft in line with said tangent and having an effective length of $R_1$, and wherein the interaction between said second transmission means and said crank arm converts between a force $F_3$ and force $F_2$.

5. A device as claimed in claim 4 wherein said second transmission means and said coupling means are long pitman linkages, said sector drive means is a gear, and said linear engaging means is a rack.

6. A device as claimed in claim 4 wherein said second transmission means and said coupling means are crossheads having a coupling with a lost motion slot perpendicular to the line of action of said respective forces $F_1$ and $F_2$, said sector drive means is a gear, and said linear engaging means is a rack.

7. A device as claimed in claim 4 wherein said second transmission means is a pitman linkage and said coupling means is a crosshead having a coupling with a lost-motion slot perpendicular to the line of action of said force $F_1$, said sector drive means is a gear and said linear engaging means is a rack.

8. A device as claimed in claim 2 wherein said first transmission means each comprise a circular sector drive means having its axis of rotation positioned in a plane perpendicular to the line of action of said linear force ($F_1$ and $F_1'$, respectively), coupling means for applying a transmitted force ($F_1$ and $F_1'$, respectively) between a moment arm of said respective sector drive means where $\theta$ is the angle between the moment arm and the line of action for the force ($F_1$ and $F_1'$, respectively) and for converting between force ($F_2$ and $F_2'$, respectively) and the force ($F_1$ and $F_1'$, respectively) at the moment arm, and linear engaging means for translating the force ($k_1 F_2$ and $k_1 F_2'$) between said respective sector drive means and along said respective given tangent, wherein said rotary shaft is positioned in a plane perpendicular to both of said respective tangents, wherein said torque means are at least one crank arm and are fixed on said rotary shaft so as to be in line with the respective tangent and having an effective length of $R_1$, and wherein the interaction between said second transmission means and said crank arm converts between a force ($F_3$ and $F_3'$, respective) and the force ($F_2$ and $F_2'$, respectively).

9. A device as claimed in claim 8 further comprising a third and fourth transmission unit, all of said units being 90° out of phase from one another and wherein said coupling means are crossheads having a coupling with a lost-motion slot perpendicular to the line of action of said respective forces $F_1$, $F_1'$, $F_1''$ and $F_1'''$ such that the resulting torques are additive to a substantially constant value of $2 \cdot k_1 R_1 F_1$.

10. A device as claimed in claim 8 wherein said second transmission means and said coupling means are long pitman linkages, each said sector drive means is a gear, and each said linear engaging means is a rack.

11. A device as claimed in claim 8 wherein said second transmission means and said coupling means are crossheads having a coupling with a lost-motion slot perpendicular to the line of action of said respective forces ($F_1$, $F_2$, $F_1'$, and $F_2'$), each said sector drive means is a gear, and each said linear engaging means is a rack.

12. A device as claimed in claim 8 wherein said second transmission means is a pitman linkage and said coupling means are crossheads each having a coupling with a lost-motion slot perpendicular to the line of action of said respective forces ($F_1$ and $F_1'$), said sector drive means is a gear, and said linear engaging means is a rack.

13. A device as claimed in claim 10 wherein said torque means are each a crank arm which are fixed spaced on said rotary shaft at 90° from each other, said means for applying $F_1$ and $F_1'$ are reciprocal constant-force hydraulic motors positioned between said crank arms to act parallely with one another and perpendicularly to said rotary shaft, said gears are 180° sector gears positioned between said crank arms to rotate in a plane parallel to the line of action of said motors and parallel to said rotary shaft, each rack engages its respective sector gear and acts along a line parallel to the line of action of said motor, each rack is fixed to move with its respective second transmission means crosshead which latter, along its lost motion slot, engages its respective crank arm.

References Cited

UNITED STATES PATENTS

| | | | |
|---|---|---|---|
| 507,142 | 10/1893 | Lloyd | 74—29 |
| 1,384,338 | 7/1921 | Powell | 74—32 |
| 2,322,788 | 6/1943 | Clements | 105—37 |
| 2,689,677 | 9/1954 | Unger | 74—32 |

FRED C. MATTERN, Jr., Primary Examiner

W. S. RATLIFF, Jr., Assistant Examiner

U.S. Cl. X.R.

74—29